Oct. 1, 1935.  R. K. LEE  2,016,150
TIRE AND RIM ASSEMBLY
Filed Oct. 12, 1931
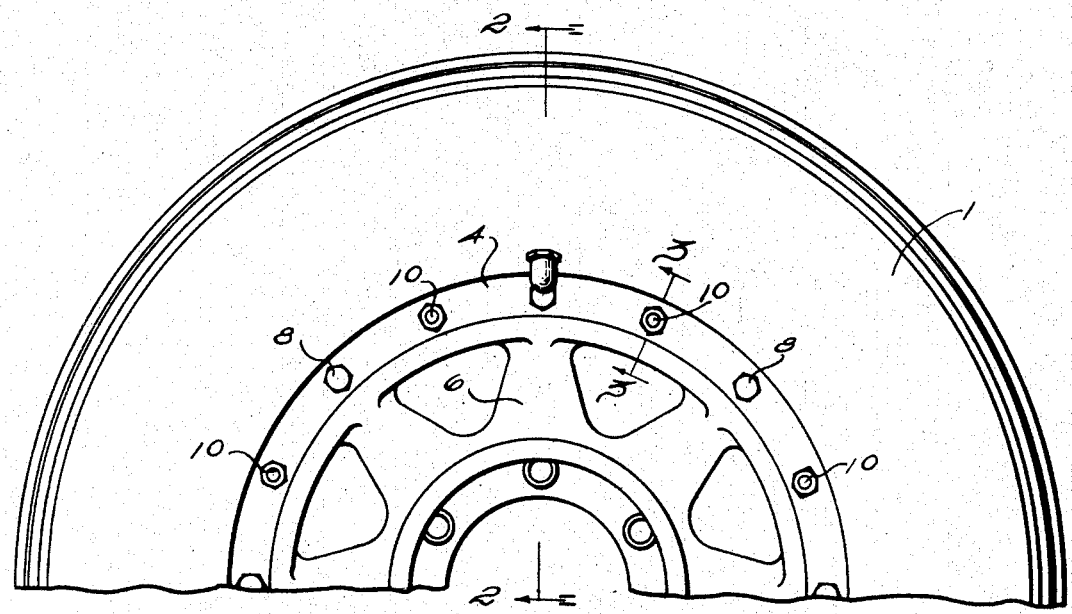
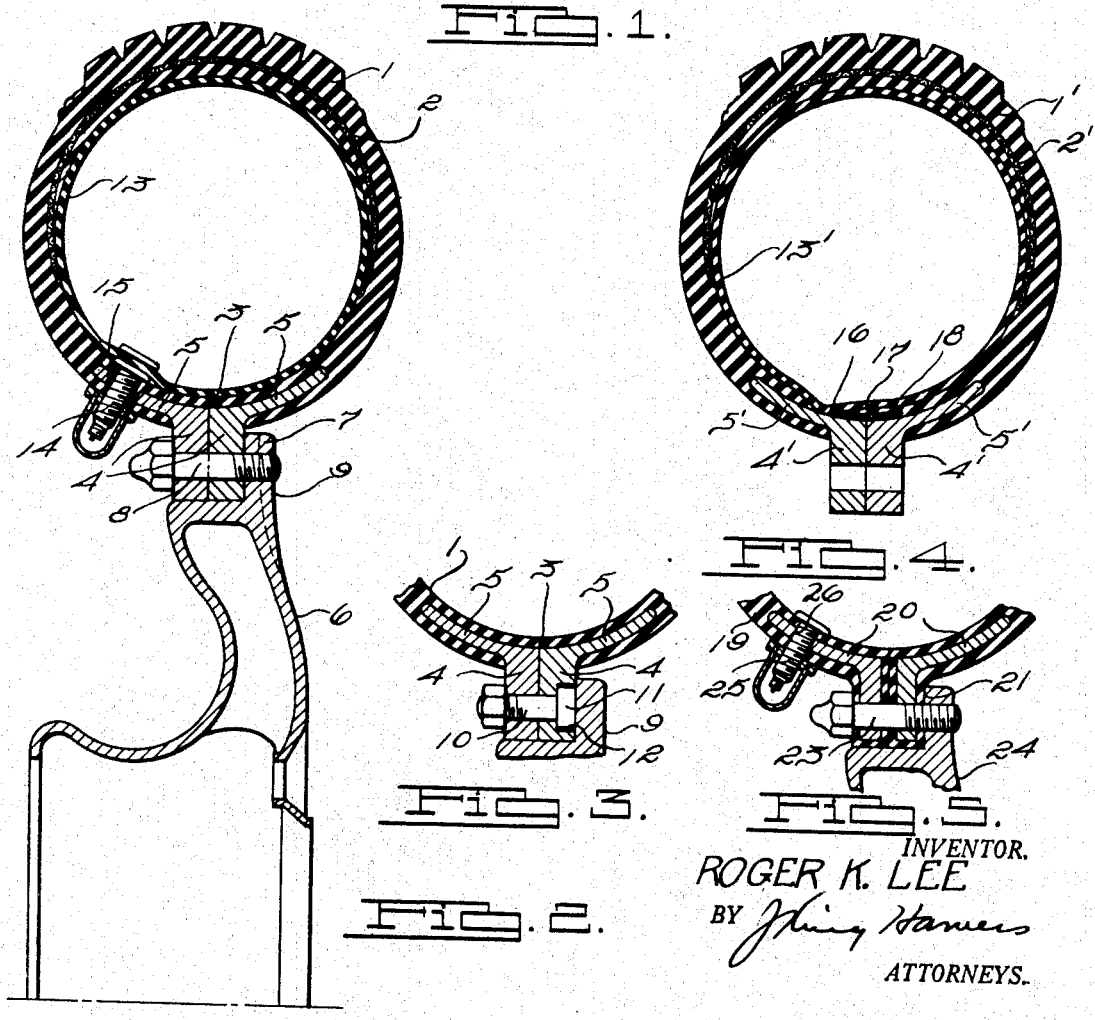
INVENTOR.
ROGER K. LEE
BY
ATTORNEYS.

Patented Oct. 1, 1935

2,016,150

UNITED STATES PATENT OFFICE 2,016,150

TIRE AND RIM ASSEMBLY

Roger K. Lee, Highland Park, Mich., assignor to Chrysler Corporation, Detroit, Mich., a corporation of Delaware Application October 12, 1931, Serial No. 568,400

17 Claims. (Cl. 152—13)

This invention relates to an improved combined pneumatic tire and rigid rim.

The main objects of the invention are to provide a pneumatic tire having permanently attached, relatively separable rim sections which are securable to a wheel structure; to provide a rim section on each of the adjacent edge portions of the tire casing which has a flange embedded in, and rigidly bonded by vulcanizing to, the walls of the casing; to provide rigid members of this kind that abut each other near the parting line of the inner peripheral wall of the casing and which are conveniently securable together and to the wheel structure; to provide means for securing the rigid rim sections together so as to prevent spreading apart of the inner peripheral wall of the casing at the parting line thereof and to enable simultaneous attachment of the tire to the wheel structure; and to provide a simple and inexpensive means for releasably clamping the sides of the split inner periphery of the tire casing together which eliminates the beaded formation used on tire casings of conventional construction.

Further objects of the invention are to provide rigid rim sections on the edge portions of the split inner peripheral wall of a tire casing which are completely enveloped by a layer of rubber formed integral with the body of the casing; and to provide an enveloping layer of rubber of this kind which serves as a gasket for sealing the joint between the rim sections when the latter are clamped together so as to permit inflation of the casing without necessitating the employment of an inner tube if desired.

An illustrative embodiment of the invention is shown in the accompanying drawing, in which:

Fig. 1 is a side elevation of the upper half of a wheel which is equipped with a tire that embodies the invention.

Fig. 2 is a transverse radial section taken on the line 2—2 of Fig. 1.

Fig. 3 is a transverse radial section of a tire taken on the line 3—3 of Fig. 1.

Fig. 4 is a transverse section of a tire which emobdies a modified form of the invention.

Fig. 5 is a transverse section of a tire illustrating a further development of the invention.

In the form shown in Figs. 1, 2 and 3, my improved tire includes an outer casing 1 which is mainly formed of rubber and which has embedded therein cord reinforcing structure 2. The casing 1 is substantially circular in cross section and it has a continuous split 3 in its inner peripheral wall, on the respectively opposite sides of which are fixed annular rim sections 4 which are preferably formed of rigid metal. The rim sections 4 have arcuate shaped flanges 5 on their respectively opposite sides which are embedded in the inner peripheral wall of the casing and permanently fixed, preferably by vulcanization, to the rubber constituent of the wall structure. The external portions of the rim sections 4 are receivable on the felloe of a wheel structure 6 which is provided with a side flange 7. These external portions of the rim section are firmly clamped together by bolts 8 which extend through registering apertures in the rim sections and which are threaded in apertures 9 of the side flange 7. In this manner, the rim sections are firmly clamped together and simultaneously secured to the wheel structure 6 by the same bolts.

The rim sections 4 may also be firmly clamped together independently of the bolts which are employed to secure the tire on the wheel so as to permit an inflated tire of this character to be carried as a spare. This is accomplished as illustrated in Fig. 3, by providing bolts 10 between each pair of bolts 9 which fix the tire to the wheel. The bolts 10 have heads 11 disposed in recesses 12 formed in the face of the rim section 4 which abuts the side flange 7 of the rim structure.

A conventional inner tube 13 having a valve 14 is confined within the casing. The valve 14 is extended through apertures in the wall casing of the structure and through a registering aperture 15 in the arcuate flange 5 of the outermost rim section 4 so as to permit convenient application of a discharge nipple of inflating apparatus.

In the form shown in Fig. 4, the outer casing 1' is substantially identical in construction to the casing shown in Figs. 1, 2 and 3, but it has a parting line 16 in its inner peripheral wall which is offset slightly from the center of the tire. The rim sections 4' each have an arcuate flange 5' embedded in the side of the inner peripheral wall of the casing on opposite sides of the parting line thereof which are rigidly fixed by vulcanization to the wall structure. These rim sections have adjacent faces which abut each other substantially at the center of the width of the tire. A flap 17 formed integral with the wall structure on one side of the parting line of the casing extends over the abutting faces of the rim sections 4 so as to prevent pinching of the inner tube 13' between the rim sections when the latter are clamped together in the above described manner. The flap 17 preferably has a reinforcing, or stiffening element 18 embedded therein which may be formed of cord, fabric, canvas, or other suitable material.

In the form shown in Fig. 5 the tire casing 19 has a continuous split in its inner peripheral wall and is provided with metal rim sections 20 having arcuate flanges embedded in the wall structure adjacent to the split. The rim sections 20 are completely enveloped within a layer of rubber 21 which is integral with the rubber constituent of the outer casing 19. The outwardly extending portions of the rim sections 20 have registering apertures through which bolts 23 may be extended for firmly clamping them together and detachably securing the tire to the wheel structure 24. Bolts having their heads received in recess in one rim section, as illustrated at 10 in Fig. 3, may also be employed for clamping the rim sections together independently of the bolts 23.

When the bolts 23 are tightened the portions of the rubber layers 21 which are disposed between the adjacent faces of the rim sections serve as gaskets and are placed under sufficient compression to form a seal which is capable of preventing the escapement of air from the interior of the outer casing so that, if desired, the inner tube may be dispensed with. When the inner tube is not used the tire casing is provided with a valve 25 which has a tubular casing that extends through openings in the wall of the tire and through a registering opening 26 in the arcuate flange of the outermost rim section 20. The valve casing may be screw threaded in the aperture 26 or it may merely extend therethrough and be fixed by vulcanization to the rubber of the side wall of the casing.

A split single tube tire of this character may be conveniently removed from the wheel of the vehicle and spread open so as to permit repairing of punctures. An inner tube, may if desired, be used in a tire casing of the type shown in Fig. 5 and in this case the seal provided by compression of the rubber layers between the rim section effectively prevents the admission of dirt and other foreign particles into the interior of the casing.

With tires of the construction shown in all forms of the invention illustrated, the conventional practice of forming beads for cooperating with a separable rim is eliminated. Tires of this character can be conveniently demounted from a wheel and spread open for permitting the removal and replacement of the inner tube with materially less effort than is required to pry conventional tire casings from their separable tire rims. The continuous non-metallic internal surface of the casing protects the inner tube from injury and avoids the introduction of particles of rust into the tire.

Although but several specific embodiments of this invention have herein been shown and described, it will be understood that various changes in the size, shape and arrangement of parts may be made without departing from the spirit of my invention and it is not my intention to limit its scope other than by the terms of the appended claims.

What I claim is:

1. A tire and rim assembly including an outer casing of toroidal shape, having a split in its inner peripheral wall, a pair of metal supporting rim sections each completely embedded in and vulcanized to said casing, one on each side of said split, means for releasably securing said rim sections together, and an inner tube in said casing.

2. In combination with a road wheel, a tire and rim assembly including an outer casing having a split in its inner peripheral wall, a pair of supporting rim sections each completely embedded in and independently vulcanized to said casing one on each side of said split and provided with adjacent external portions, and means for clamping the external portions of said rim sections together and to the outer periphery of said wheel.

3. A tire casing having a split in its inner peripheral wall, a pair of annular rigid metal supporting rim members each having a flange embedded in the structure of said casing on opposite sides of said split respectively, said flanges and the outer peripheral surface of said metal members being vulcanized to said casing, means for releasably securing said members together, an inner tube in said outer casing removable through said split when said members are released, and a valve on said inner tube extending outwardly from said outer casing through an aperture in one of said flanges.

4. In combination with a road wheel having a felloe and a radial flange adjacent one edge thereof, a toroidal tire casing including rubber concentric with said felloe having a split in its inner peripheral wall, a pair of supporting rim sections each having a permanent vulcanized bond with the rubber of said casing, one located on each side of said split and having adjacent external portions seated on the felloe of said wheel, and means releasably securing the external portions of said rim sections together and to the radial flange of said wheel.

5. A tire including an outer toroidal flexible casing having a continuous split in its inner peripheral wall, a supporting rim section vulcanized to the inner peripheral wall of said casing on one side of the split thereof including an external portion having a side face underlying a portion of said inner peripheral wall, a complementary rim section vulcanized to the inner peripheral wall on the other side of said split having a side face extending in advance of the adjacent side of said split and engageable with the side face of the other rim section, and means for releasably securing said rim sections together.

6. In a tire, a pair of separable rim sections including external portions having abutting side faces and oppositely extending flanges, an outer casing concentric with said rim sections having wall portions enveloping and permanently fixed to said flanges and having an integral internal flap extending over the abutting faces of said rim sections, and means for releasably securing the external portions of said rim sections together.

7. In a tire, a pair of separable rim sections including external portions having abutting side faces and oppositely extending flanges, an outer casing concentric with said rim sections having wall portions enveloping and permanently fixed to said flanges and having an integral internal flap extending over the abutting faces of said rim sections, a fabric element embedded in said flap and means for releasably securing the external portions of said rim sections together.

8. A casing-air-tube consisting of a tire-casing divided on its inner side, and stiff non-elastic circular means forming portions of the wall thereof joined to said divided side and which means has only one separable joint to be sealed.

9. A casing-air-tube consisting of a tire-casing divided on its inner side, and stiff non-elastic circular means forming portions of the wall thereof partly joined to said divided side and which means has only one separable joint to be sealed.

10. A casing-air-tube consisting of a tire-casing divided on its inner side, and a two-part stiff non-elastic sealing-ring each part being joined at its outer side to its associated side of said tire-casing, to form the inner wall of said casing and a flange formed at the inner side of each of the parts of the sealing-ring adapted to be brought together through their capacity to laterally react to mechanical pressure to seal said tire-casing.

11. As a new article of manufacture, a substantially circular air-tube the inner-wall portion of which has a single annular division and is ring-like in form and of a nature different from the rest of the tube so that the internal diameter of the tube will be substantially constant, the said inner wall being capable through its own nature of constant reaction to a lateral force to close and seal said annular division.

12. As a new article of manufacture, an air-tube having a stiff non-elastic inner-wall portion continuous with the rest of the tube and having a single circular opening therethrough, the sealing of said opening being effected by the capacity of said inner-wall portion to react directly to a lateral mechanical force, substantially without increasing the internal diameter of the air-tube.

13. In combination, a tire-casing, and a metal non-elastic sealing ring forming the inner wall thereof and having only one separable joint to be sealed.

14. In combination, a tire-casing, and a two-part metal non-elastic sealing-ring forming the inner wall thereof, the opposing edges of said parts reacting to external mechanical pressure to co-act to form a sealed joint.

15. As a new article of manufacture, a casing-air-tube a cross section of which discloses resilient side walls and tread, and a metal plate-like non-elastic pressure-ring associated with said side walls to complete the said section and having only one sealable joint through which access is had to the interior of said tube.

16. In combination, a tire-casing a cross section of which discloses resilient side walls, a tread portion, and a sealing-ring forming a wholly stiff inner-wall portion which has a single division therein, said sealing-ring being capable of responding solely laterally to mechanical pressure exerted exteriorly against the said casing to effect and maintain sealing of said division irrespective of the air pressure within said casing.

17. A tire casing of toroidal cross-section composed of rubber and fabric and having an annular split in its inner peripheral wall, an inner tube within said casing, a pair of rigid metal rim members vulcanized to said casing, one on each side of the split in the inner peripheral wall, and means for releasably securing said metal members together, said casing comprising a layer of rubber separating said rim members from said inner tube.

ROGER K. LEE.